United States Patent [19]
Schiffino et al.

[11] Patent Number: 5,696,213
[45] Date of Patent: Dec. 9, 1997

[54] ETHYLENE-α-OLEFIN-DIOLEFIN ELASTOMERS SOLUTION POLYMERIZATION PROCESS

[75] Inventors: Rinaldo Soria Schiffino, Kingwood; Javier Mario Zamora, Houston, both of Tex.

[73] Assignee: Exxon Chemical Patents Inc., Houston, Tex.

[21] Appl. No.: 426,363

[22] Filed: Apr. 21, 1995

[51] Int. Cl.$^6$ ............................................. C08F 4/64
[52] U.S. Cl. .................... 526/158; 526/160; 526/170; 526/348.6; 526/904; 502/103; 502/117; 502/121; 502/123; 502/124; 502/125
[58] Field of Search ................ 526/158, 160, 526/170, 348.6, 904; 502/103, 117, 121, 123, 124, 125

[56] References Cited

U.S. PATENT DOCUMENTS

| | | | |
|---|---|---|---|
| 5,096,867 | 3/1992 | Canich | 502/103 |
| 5,198,401 | 3/1993 | Turner et al. | 502/155 |
| 5,229,478 | 7/1993 | Floyd et al. | 526/160 |
| 5,264,405 | 11/1993 | Canich | 502/103 |
| 5,304,164 | 4/1994 | Winter et al. | 526/127 |
| 5,408,017 | 4/1995 | Turner et al. | 526/134 |

FOREIGN PATENT DOCUMENTS

| | | | |
|---|---|---|---|
| A-0 612 768 | 2/1994 | European Pat. Off. | C08F 210/16 |
| A 0 643 066 | 3/1995 | European Pat. Off. | |
| WO 93/25590 | 12/1993 | WIPO | C08F 10/00 |
| WO A 94 00500 | 1/1994 | WIPO | |

*Primary Examiner*—James J. Seidleck
*Assistant Examiner*—Duc Truong

*Attorney, Agent, or Firm*—William G. Muller; Gerald D. Malpass; Douglas W. Miller

[57] ABSTRACT

This invention is a solution process for the preparation of ethylene-α-olefin/diolefin copolymers comprising contacting ethylene, one or more α-olefin monomer, and optionally one or more diene monomer, with a catalyst system containing a catalyst activator and a Group 4 metallocene compound, comprising a) conducting the polymerization reaction at a temperature of about 60° to 150° C.; b) selecting as the Group 4 metallocene compound one or more members of the group consisting of cyclic monocyclopentadienyl Group 4 metal and covalently bridged (bis)indenyl hafnium metallocene compounds; and c) maintaining the α-olefin concentration at a molar ratio to that of ethylene of between about 0.3 to 7.0 and a diolefin to ethylene molar ratio of between about 0.01 and 0.4. In a preferred embodiment the process comprises: 1) mixing with a reaction solvent the one or more α-olefin monomer, the optional one or more diene monomer, and the catalyst activator, either together or separately, therafter 2) mixing with the reaction solvent an effective scavenging compound prior to or with introduction of the unactivated Group 4 metallocene compound under conditions such that the scavenging compound is in contact with the activator compound for a period of time not exceeding about 1 minute, and 3) contacting the activator compound with the unactivated Group 4 metallocene compound in the presence of said monomers. The process can be advantageously practiced a reaction temperature of at least 60° C., preferably above 80° C., most preferably above 110° C., to achieve high number average molecular weight polymer having high α-olefin monomer and diene monomer contents with high diene conversion rates. The process is particularly suitable for the preparation of elastomeric ethylene-propylene or ethylene-propylene-diene monomer elastomers.

11 Claims, 2 Drawing Sheets

ETHYLENE-α-OLEFIN-DIOLEFIN ELASTOMERS SOLUTION POLYMERIZATION PROCESS

TECHNICAL FIELD

This invention relates to the preparation of ethylene-α-olefin/diolefin polymers under solution polymerization conditions using ionic catalyst systems based on Group 4 metallocene compounds activated by ionization and stabilized with non-coordinating anions or activated with alumoxane compounds.

BACKGROUND OF THE INVENTION

Ethylene-α-olefin/diolefin polymers make up a large segment of polyolefin polymers. Such polymers range from crystalline polyethylene copolymers to largely amorphous elastomers, with a new area of semi-crystalline "plastomers" in between. In particular, ethylene-α-olefin/diolefin elastomers are a well established class of industrial polymers having a variety of uses associated with their elastomeric properties, their thermo-oxidative stability, their solubility in hydrocarbon oleaginous fluids, and their ability to modify the properties of polyolefins. Included in this terminology are both EPM (ethylene-propylene copolymers) and EPDM (ethylene-propylene-diolefin terpolymers) rubber, both being vulcanizable by cross-linking, the addition of the diolefin providing increased ease of both cross-linking and functionalization. The vulcanized compounds are used in traditional thermoplastic applications when used with fillers, particularly in the automotive industry for such as belts, hoses and seals, in rubbery blends such as tire sidewall applications where they can be co-vulcanized with other rubbers, as roof coating materials, and in thermoplastic elastomeric alloys wherein the EPDM is dynamically vulcanized in a matrix of other thermoplastic polymer so as to create a dispersed phase of vulcanized elastomer in plastic. The rubbery characteristics of EPM and EPDM can provide toughening properties to any of a number of polar monomer based engineering thermoplastics, particularly when functionalized. Further the EPM and EPDM can both serve as effective viscosity modifiers for fuels and lubricating oils and can additionally provide dispersant and oxidative stabilizing characteristics for those oleaginous compounds when functionalized with polar functionalities including those based on amine and carboxylic acid moieties.

The most commercially interesting molecular weight for elastomeric ethylene-α-olefin/diolefin copolymers exceeds about 50,000 $M_n$. Further, the incorporation of high levels of diolefins, beyond those commercially provided by traditional Ziegler catalysts, is highly desired for improved capabilities for cross-linking in vulcanizates and in graft functionalization with non-hydrocarbyl moieties for improved compatibilities and applications requiring greater affinity to non-hydrocarbyl chemical compounds. Additionally, the use of high temperature solution processes provide the potential for industrial benefits in ease of handling the amorphous elastomers since their solubility in the polymerization solvent increases and solution viscosity is accordingly decreased. A traditional bottleneck in the manufacture of elastomeric polymers at high temperatures is their resulting low molecular weight. Thus an ability to capitalize on inherent solution viscosity improvements at higher operating temperatures while retaining high molecular weight polymers with high comonomer content is important.

Although broadly described as suitable for polyolefin solution polymerization processes, metallocene catalysts have shown limitations in their molecular weight capabilities. Due to relatively fast termination (or chain transfer) reactions, such as the β-hydride elimination reaction, metallocene catalysts tend to produce polymers and copolymers of low molecular weights at high temperatures ($M_n$ not more than about 50,000). This problem becomes more pronounced when the α-olefin comonomer content is relatively high (above 20 mol. %), which further depresses the molecular weight. In addition the incorporation of the necessary levels of dienes at high conversions are crucial for the efficient production of effectively curable EPDM rubbers.

With the advent of metallocene catalysts, certain processes have become available for both EPM and EPDM. A bulk, or slurry, process utilizing supported, bridged biscyclopentadienyl Group 4 metallocenes activated with alumoxane co-catalysts is described as suitable for EPM and EPDM in U.S. Pat. No. 5,229,478. It is stated therein that prior art metallocene/alumoxane catalyst systems, directed to the preparation of ethylene-α-olefin elastomers, typically produce low molecular weight polymer not suited for use as a commercial elastomer. Thus advantages of higher molecular weight and high diene conversion rates are emphasized. The patented process utilizes metallocene compounds having alkyl, silanylene or silaalkylene bridged cyclopentadienyl ligands in a slurry of supported catalyst in liquid α-olefin at temperatures most preferably ranging from about 20° to 60° C. Each invention polymerization example was conducted with defined zirconocenes in a reaction medium temperature of not greater than 50° C. Examples in Tables IA and IB illustrate terpolymers with $M_n$ of about 30,000 to 129,000 with ethylene contents ranging from 36 to 78 wt. %, with reaction temperatures of 45° to 60° C. This process illustrates the use of support techniques and materials adding to the complexity and cost of the method for industrial use.

Catalyst systems based on monocyclopentadienyl transition metal compounds activated with alumoxane suitable for the preparation of ethylene-α-olefin copolymers of high molecular weight and high α-olefin content are described in U.S. Pat. No. 5,264,405. Copolymerization of ethylene with propylene at temperatures above 50° C. with these catalysts are illustrated in the examples. Thus in Example 45 at 80° C. a copolymer with 20 wt % ethylene having an $M_n$ of about 20,080 was produced. In Example 55 at a reaction temperature of 140° C. an ethylene-propylene copolymer having a density of 0.863, indicative of an amorphous ethylene copolymer, exhibited an $M_n$ of about 46,500.

Catalysts comprised of metallocene cations and non-coordinating anions found to be suitable for the polymerization of EPM and EPDM under solution process conditions are described in U.S. Pat. No. 5,198,401. Extensive description of non-coordinating anions is presented and Examples 29 through 33 address ethylene-α-olefin/diolefin elastomers having high molecular weights ($M_n$ from 21,000 to 317,000) and high α-olefin content (e.g., about 25 mol. % and about 65 wt %) using a catalyst based on bis(cyclopentadienyl) hafnium dimethyl at polymerization reaction temperatures of 50° C. Diene content of the sole example of a diene-containing copolymer is 4.7 mol. % where the rate of conversion of the diene monomer incorporated monomer was 4.68% based on initial monomer content in the reactor. WO 93/25590 describes a high temperature/high pressure process using both bis(cyclopentadienyl) and monocyclopentadienyl Group IVB transition metal compounds suitable for the polymerization of ethylene, α-olefins, and diolefins, the temperature exceeding 140° C. and the pressure exceeding 500 bar. It is noted that high polymerization activities are retained even above 160° C. where non-coordinating anion cocatalysts are employed instead of alumoxane. The catalysts illustrated in the examples are silicon bridged, substituted bis(cyclopentadienyl) zirconium and hafnium metallocenes. It was observed that polymer $M_w$ decreased with increasing temperature, being 20,000 at 183° C. and 1863 at 269° C.

A high temperature solution process for the preparation of ethylene-α-olefin copolymers is described in EP-A-0 612 768. The catalyst system is based on bis(cyclopentadienyl/indenyl/fluorenyl) hafnocenes which are combined with an alkyl aluminum compound and ionizing ionic compound which provides a noncoordinating anion. The solution process conditions are described to range from 120° to 300° C. at pressures from atmospheric to 200 kg/cm². In the examples of this process the hafnocenes compound is reacted with the organoaluminum compound, then reacted with ionizing ionic compound, and subsequently added to the polymerization reactor. Each of the polymers produced exhibited crystalline melting points illustrating a major distinction from amorphous elastomers, and as well exhibited $M_n$ under 55,000 (Example 4 exhibiting $M_w$=170,000 $M_w/M_n$=3.2, and $M_n$=53,125).

INVENTION DISCLOSURE

The invention is a process for the preparation of ethylene-α-olefin/diolefin copolymer comprising contacting ethylene, one or more α-olefin monomer, and optionally one or more diene monomer, in solution with a catalyst system comprising a catalyst activator and a Group 4 metallocene compound, having the improvement comprising a) conducting the polymerization reaction at a temperature of about 60° to 150° C.; b) selecting as the Group 4 metallocene compound one or more members of the group consisting of cyclic monocyclopentadienyl Group 4 metal and covalently bridged (bis)indenyl hafnium metallocene compounds; and c) maintaining the α-olefin concentration at a molar ratio to that of ethylene of between about 0.3 to 7.0 and a diolefin to ethylene molar ratio of between about 0.01 and 0.4. In a preferred embodiment the process comprises: 1) mixing with a reaction solvent, the one or more α-olefin monomer, the optional one or more diene monomer, and the catalyst activator, either together or separately, an effective scavenging compound prior to or with introduction of the unactivated Group 4 metallocene compound under conditions such that the scavenging compound is in contact with the activator compound for a period of time not exceeding about 1 minute. Where an alumoxane is the catalyst activator, it may he added in amounts suitable for both scavenging and catalyst activation functions, solely in the manner of the scavenging compound or as both activator and scavenger as described so long as combined with the metallocene compound in the presence of polymerizable monomers in a manner to achieve in situ activation. By use to the invention process polymer having high number average molecular weight ($M_n$), high α-olefin incorporation and high diolefin conversion to incorporated monomer can be prepared under economically advantageous reaction temperatures, typically exceeding 60° C. In particular, ethylene-α-olefin/diolefin elastomers of molecular weights greater than 55,000 $M_n$ can be prepared under the high temperature conditions.

BEST MODE AND EXAMPLES OF THE INVENTION

Figure 1:
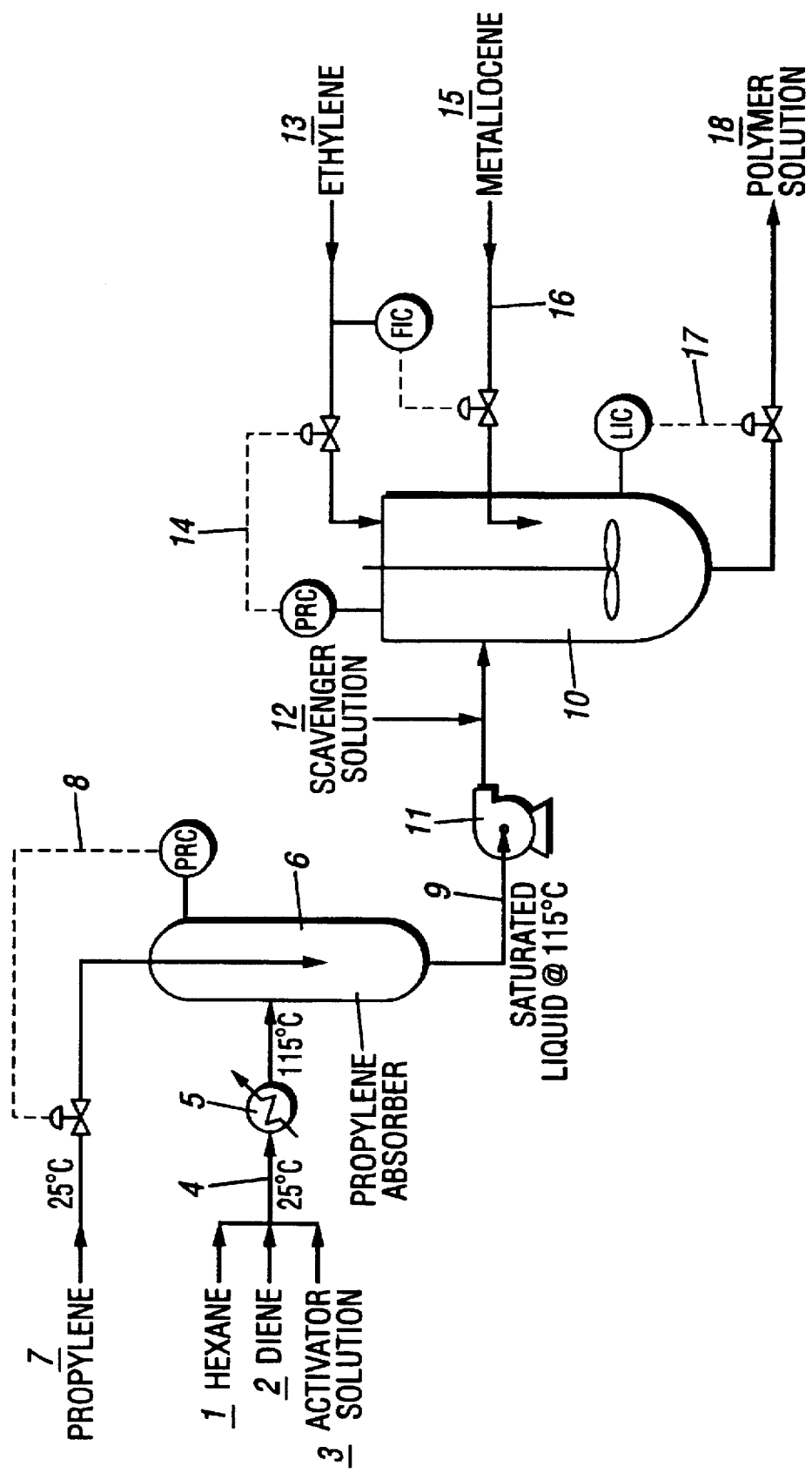
FIG. 1 is a schematic drawing of a preferred means of operating the invention process. In the process as drawn, hexane (1), diolefin (2) and activator in solution, are added to provide a solution (4) which is heated in the heat exchanger (5) before being contacted in an absorber (6) with propylene (7) to maintain necessary pressure as measured by a pressure control loop (PRC). The resulting solution (9) is transferred to the polymerization reactor (10) through the feed pump (11) and scavenging compound (12) is added before introduction into the reactor. Ethylene (13) is added for pressure control through a pressure control loop (PRC) and metallocene compound (14) is added according to the flow of ethylene as controlled by a flow indicator loop (FIC). A liquid level indicator control loop (LIC) then regulates the withdrawal of polymer solution (18).

The ethylene-α-olefin/diolefin copolymer elastomer, or rubber, of this invention (hereinafter referred to as "EPR") is meant to include elastomeric copolymers, terpolymers, tetrapolymers, etc. It will comprise ethylene, one or more alpha-olefins, and optionally, one or more diene monomers; it will be substantially amorphous; and it will have a substantially random arrangement of at least the ethylene and the alpha-olefin monomers. Though focussed on EPR, the process will have utility for polyethylene copolymers (having ethylene and one or more comonomer such as described herein) having lower incorporation of the comonomers such that it is not strictly elastomeric as defined below but useful otherwise in the manner known in the art for such crystalline and semi-crystalline polymers. Typically the polyethylene copolymers will have a polymer density of 0.88 to 0.93 g/cm³, while the elastomers generally will have even lower density.

The EPR, capable of preparation in accordance with the invention process generally can have a molecular weight range typically between about 55,000 and up to about 500,000 or higher, more typically between about 60,000 and 300,000 where the molecular weight is number-average ("$M_n$").

Typically EPR is "substantially amorphous", and when that term is used to define the EPR of this invention it is to be taken to mean having a degree of crystallinity less than about 25% as measured by means known in the art, preferably less than about 15%, and more preferably less than about 10%. The three major known methods of determining crystallinity are based on specific volume, x-ray diffraction, and infrared spectroscopy. Another well-established method, based on measurement of heat content as a function of temperature through the fusion range, is carried out using differential scanning calorimetric measurements. It is known that these independent techniques lead to reasonably good experimental agreement. The degree of randomness of the arrangement of monomers in the EPR also affects the crystallinity and is appropriately characterized by the degree of crystallinity.

Additionally, it is known in the art that the tendency of a particular combination of catalyst system and monomers to produce blocky, random, or alternating polymers can be characterized by the product of the reactivity ratios defined for the given monomers under the specific reaction conditions encountered. If this product is equal to 1.0, the sequence distribution will be perfectly random; the more the product is less than 1.0, the more the monomers will tend to have a "blocky" sequence distribution. Generally speaking, the segments of a polymer which crystallize are linear segments of a polymer which have a number of identical (both by chemical make-up and stereo-specific orientation) units in a row. Such segments are said to be "blocky". If there is little or no such sequential order within the segments making up a polymer chain, that chain will be very unlikely to conform itself into the correct shape to fit into the spatial order of a crystal and will accordingly exhibit a low degree of crystallinity. See, "Ethylene-Propylene Copolymers. Reactivity Ratios, Evaluation and Significance", C. Cozewith and G. Ver Strate, *Macromolecules*, Vol. 4, No. 4, 482–489 (1971). The EPR of this invention accordingly can be characterized in one embodiment by the limitation that its method for preparation has a reactivity ratio product less than 2.0, preferably less than about 1.5, and more preferably less than about 1.25.

The EPR will contain about 10 to about 75 weight percent ethylene, preferably about 20 to 75 weight percent ethylene.

Alpha-olefins suitable for use in the preparation of the EPR, or for the polyethylene copolymers, are preferably $C_3$ to $C_{20}$ alpha-olefins. Illustrative non-limiting examples of such alpha-olefins are one or more of propylene, 1-butene, 1-pentene, 1-hexene, 1-octene, and 1-decene. The alpha-olefin content of the EPR ranges depending upon selection of the specific α-olefin or α-olefins, being more for lower carbon number monomers, for example, about 25 to about 90 wt. %, preferably about 30 to about 80 wt. % for propylene; and, 5 to 35 mol. %, preferably 7.5 to 25 mol. % and most preferably 10 to 20 mol. % for 1-octene. For the polyethylene copolymers the range of comonomer incorporation will typically be below 20 mol. %, preferably below 15 mol. % and most preferably below 10 mol. %.

The diene monomers, or diolefins, useful in this invention include those typically used in known EPDM polymers. The typically used diene monomers are generally selected from the easily polymerizable non-conjugated dienes and can be straight chain, hydrocarbon diolefins or cycloalkenyl-substituted alkenes, having about 6 to about 15 carbon atoms, for example:

A. straight chain acyclic dienes such as 1,4-hexadiene and 1,6 octadiene.

B. branched chain acyclic dienes such as 5-methyl-1,4-hexadiene; 3,7-dimethyl-1,6-octadiene; 3,7-dimethyl-1,7-octadiene and the mixed isomers of dihydro-myricene and dihydro-ocinene;

C. single ring alicyclic dienes such as 1,3-cyclopentadiene; 1,4-cyclohexadiene; 1,5-cyclo-octadiene and 1,5-cyclododecadiene;

D. multi-ring alicyclic fused and bridged ring dienes such as tetrahydroindene, methyl tetrahydroindene, dicyclopentadiene; bicyclo-(2,2,1)-hepta-2,5-diene; alkenyl, alkylidene, cycloalkenyl and cycloalkylidene norborenes such as 5-methylene-2-norbornene (MNB), 5-ethylidene-2-norbornene, 5-isopropylidene-2-norbornene, 5-(4-cyclopentenyl)-2-norbornene, 5 -cyclohexylidene-2-norborene, 5-vinyl-2-norborene; and E. cycloalkenyl-substituted alkenes, such as allyl cyclohexene, vinyl cyclooctene, allyl cyclohexene, vinyl cyclooctene, allyl cyclodecene, vinyl cyclododecene.

Of these, the preferred dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norborene and 1,4-hexadiene. It will be apparent that a mix of such dienes can also be utilized. The content of the optional diene monomer in the EPR can be 0 to about 20 weight percent, and if used, preferably 0.5 to about 15 weight percent, and most preferably about 2.0 to about 12.0 weight percent. Surprisingly, diene incorporation greater than 5.0 wt %, even greater than either 8.0 wt. % or 10.0 wt. % is made possible using the process of this invention. The content of the optional diene monomer in the ethylene copolymer of the invention can range similarly as that for the EPR, but will be preferably in the lower ranges, for example 0.1 to 8 mol. %.

The cyclic monocyclopentadienyl metallocene compounds of this invention are represented by those described in the prior art, for example in WO92/00333. These catalysts typically comprise Group 4 transition metals having ancillary ligands including a substituted or unsubstituted cyclopentadienyl ligand, a substituted Group 15 heteroatom ligand, the cyclopentadienyl ligand and heteroatom ligands being covalently bridged, and at least one additional ligand that can be abstracted for activation to a catalytically active state.

The monocyclopentadienyl metallocene compounds of the present invention can be represented by the formula:

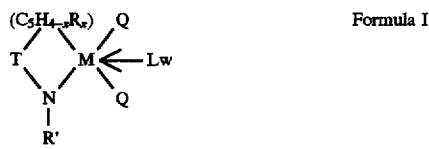

Formula I wherein:

M is Zr, H for Ti;

$(C_5H_{4-x}R_x)$ is a cyclopentadienyl ring which is substituted with from zero to four substituent groups R, "x" is 0, 1, 2, 3, or 4 denoting the degree of substitution, and each substituent group R is, independently, a radical selected from $C_1$ to $C_{20}$ hydrocarbyl radicals, substituted $C_1$ to $C_{20}$ hydrocarbyl radicals wherein one or more hydrogen atoms is replaced by a halogen radical, an amido radical, a phosphido radical, an alkoxy radical, an aryloxy radical or any other radical containing a Lewis acidic or basic functionality; $C_1$ to $C_{20}$ hydrocarbyl-substituted metalloid radicals wherein the metalloid is selected from the Group IV A of the Periodic Table of Elements; halogen radicals; amido radicals; phosphido radicals; alkoxy radicals; alkylborido radicals; or any other radical containing Lewis acidic or basic functionality; or $(C_5H_{4-x}R_x)$ is a cyclopentadienyl ring in which at least two adjacent R-groups are joined together and along with the carbon atoms to which they are attached form a $C_4$ to $C_{20}$ ring system;

R' is a radical selected from $C_4$ to $C_{30}$, preferably $C_4$ to $C_{20}$, alicyclic hydrocarbyl radicals wherein one or more hydrogen atoms may be replaced by radicals containing Lewis acidic or basic functionalities such as, for example, radicals selected from halogen, amido, phosphido, alkoxy, aryloxy and the like;

each Q is independently a radical selected from halide; hydride; substituted or unsubstituted $C_1$ to $C_{20}$ hydrocarbyl; alkoxide; aryloxide; amide; halide or phosphide, or both Q together may be an alkylidene or a cyclometallated hydrocarbyl or any other divalent anionic chelating ligand, with the proviso that where any Q is a hydrocarbyl radical, such Q is not a substituted or unsubstituted cyclopentadienyl radical;

T is a covalent bridging group containing a Group 14 or 15 element such as, but not limited to, a dialkyl, alkylaryl or diaryl silicon or germanium radical, alkyl and/or aryl phosphine or amine radical; or a substituted or unsubstituted hydrocarbyl radical such as methylene, ethylene and the like which may be substituted with substituents selected from alkyl and aryl radicals having from 1 to 20 carbon atoms and silyl radicals.

Such compounds can also include an $L_w$ complexed thereto wherein L is a neutral Lewis base such as diethylether, tetraethylammonium chloride, tetrahydrofuran, dimethylaniline, aniline, trimethylphosphine, n-butylamine, and the like; and "w" is a number from 0 to 3.

L can also be a second transition metal compound of the same type such that the two metal centers M and M* are bridged by Q and Q*, wherein M' has the same meaning as M, and Q' has the same meaning as Q. Such dimeric compounds are represented by the formula:

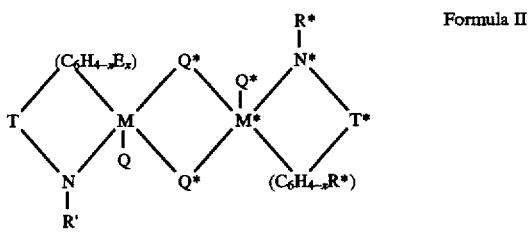

Formula II

The compounds most preferred for reasons of their high catalyst activity in combination with an ability to produce high molecular weight ethylene-α-olefin copolymers of high comonomer contents are those of the formulae above wherein $R^1$ and R* are each independently a $C_1$ to $C_3$ hydrocarbyl radical, each Q and Q* is independently a halide or alkyl radical, R* is an aliphatic or an alicyclic hydrocarbyl radical of the formula $(C_nH_{2n+b})$ wherein "n" is a number from 3 to 20 and "b" is +1 in which case the ligand is aliphatic or −1 in which case the ligand is alicyclic. Of these compounds, the most preferred is that compound wherein $R^1$ and R* are methyl, each Q and Q* is chlorine or methyl, n is 12, and the hydrocarbyl radical is alicyclic (i.e., b is −1). Most preferred is that compound wherein the $C_nH_{2n-1}$ hydrocarbyl radical is a cyclododecyl group. Hereafter this compound is referred to for convenience as $Me_2Si(C_5Me_4)(NC_{12}H_{23})TiQ_2$.

Examples of cyclic monocyclopentadienyl metallocene compounds include:
dimethylsilytetramethyl-cyclopentadienyl-tert-butyl amido titanium dichloride;
dimethylsilytetramethyl-cyclopentadienyl-tert-butyl amido titanium dimethyl;
dimethylsilytetramethyl-cyclopentadienyl-tert-butyl amido zirconium dichloride;
dimethylsilytetramethyl-cyclopentadienyl-tert-butyl amido zirconium dimethyl;
dimethylsilytetramethyl-cyclopentadienyl-tert-butyl amido hafnium dichloride;
dimethylsilytetramethyl-cyclopentadienyl-tert-butyl amido hafnium dimethyl;
dimethylsily-tert-butylcyclopentadienyl cyclododecyl amido titanium dichloride;
dimethylsily-tert-butylcyclopentadienyl cyclododecyl amido titanium dimethyl;
dimethylsily-tert-butylcyclopentadienyl cyclododecyl amido zirconium dichloride;
dimethylsily-tert-butylcyclopentadienyl cyclododecyl amido zirconium dimethyl;
dimethylsily-tert-butylcyclopentadienyl cyclododecyl amido hafnium dichloride;
dimethylsily-tert-butylcyclopentadienyl cyclocodecyl amido hafnium dimethyl;
dimethylsily-methylcyclopentadienyl cyclododecyl amido titanium dichloride;
dimethylsily-methylcyclopentadienyl cyclododecyl amido titanium dimethyl;
dimethylsily-methylcyclopentadienyl cyclododecyl amido zirconium dichloride;
dimethylsily-methylcyclopentadienyl cyclododecyl amido zirconium dimethyl;
dimethylsily-methylcyclopentadienyl cyclododecyl amido hafnium dichloride;
dimethylsily-methylcyclopentadienyl cyclododecyl amido hafnium dimethyl;
dimethylsilytetramethyl-cyclopentadienyl-sec-butyl amido titanium dichloride;
dimethylsilytetramethyl-cyclopentadienyl-sec-butyl amido titanium dimethyl;
dimethylsilytetramethyl-cyclopentadienyl-sec-butyl amido zirconium dichloride;
dimethylsilytetramethyl-cyclopentadienyl-sec-butyl amido zirconium dimethyl;
dimethylsilytetramethyl-cyclopentadienyl-sec-butyl amido hafnium dichloride;
dimethylsilytetramethyl-cyclopentadienyl-sec-butyl amido hafnium dimethyl;
dimethylsilymethyl-cyclopentadienyl-diisopropylphenyl amido titanium dichloride;
dimethylsilymethy-cyclopentadienyl-2,6-diisopropylphenyl amido titanium dimethyl;
dimethylsilymethyl-cyclopentadienyl-diisopropylphenyl amido zirconium dichloride;
dimethylsilymethyl-cyclopentadienyl-diisopropylphenyl amido hafnium dimethyl;
dimethylsilymethyl-cyclopentadienyl-cyclohexyl amido titanium dichloride;
dimethylsilymethyl-cyclopentadienyl-cyclohexyl amido titanium dimethyl;
dimethylsilymethyl-cyclopentadienyl-cyclohexyl amido zirconium dichloride;
dimethylsilymethyl-cyclopentadienyl-cyclohexyl amido zirconium dimethyl;
dimethylsilymethyl-cyclopentadienyl-cyclohexyl amido hafnium dichloride;
dimethylsilymethyl-cyclopentadienyl-cyclohexyl amido hafnium dimethyl;
dimethylsilymethyl-cyclopentadienyl-3,6-di-tert-butyl-phenyl amido titanium dichloride;
dimethylsilymethyl-cyclopentadienyl-di-tert-butyl-phenyl amido titanium dimethyl;
dimethylsilymethyl-cyclopentadienyl-di-tert-butyl-phenyl amido zirconium dichloride;
dimethylsilymethyl-cyclopentadienyl-di-tert-butyl-phenyl amido zirconium dimethyl;
dimethylsilymethyl-cyclopentadienyl-di-tert-butyl-phenyl amido hafnium dichloride;
dimethylsilymethyl-cyclopentadienyl-di-tert-butyl-phenyl amido titanium dimethyl;
dimethylsilytetramethyl-cyclopentadienyl-n-butyl amido titanium dichloride;
dimethylsilytetramethyl-cyclopentadienyl-n-butyl amido titanium dimethyl;
dimethylsilytetramethyl-cyclopentadienyl-n-butyl amido zirconium dichloride;
dimethylsilytetramethyl-cyclopentadienyl-n-butyl amido zirconium dimethyl;
dimethylsilytetramethyl-cyclopentadienyl-n-butyl amido hafnium dichloride;
dimethylsilytetramethyl-cyclopentadienyl-n-butyl amido hafnium dimethyl;

methylphenylsilyltetramethyl-cyclopentadienyl-cyclododecyl amido titanium dichloride;
methylphenylsilyltetramethyl-cyclopentadienyl-cyclododecyl amido titanium dimethyl;
methylphenylsilyltetramethyl-cyclopentadienyl-cyclododecyl amido zirconium dichloride;
methylphenylsilyltetramethyl-cyclopentadienyl-cyclododecyl amido zirconium dimethyl;
methylphenylsilyltetramethyl-cyclopentadienyl-cyclododecyl amido hafnium dichloride;
methylphenylsilyltetramethyl-cyclopentadienyl-cyclododecyl amido hafnium dimethyl;
methylphenylsilyltetramethyl-cyclopentadienyl-n-butyl amido titanium dichloride;
methylphenylsilyltetramethyl-cyclopentadienyl-n-butyl amido titanium dimethyl;
methylphenylsilyltetramethyl-cyclopentadienyl-n-butyl amido zirconium dichloride;
methylphenylsilyltetramethyl-cyclopentadienyl-n-butyl amido zirconium dimethyl;
methylphenylsilyltetramethyl-cyclopentadienyl-n-butyl amido hafnium dichloride;
methylphenylsilyltetramethyl-cyclopentadienyl-n-butyl amido hafnium dimethyl;
methylphenylsilyltetramethyl-cyclopentadienyl-sec-butyl amido titanium dichloride;
methylphenylsilyltetramethyl-cyclopentadienyl-sec-butyl amido titanium dimethyl;
methylphenylsilyltetramethyl-cyclopentadienyl-sec-butyl amido zirconium dichloride;
methylphenylsilyltetramethyl-cyclopentadienyl-sec-butyl amido zirconium dimethyl;
methylphenylsilyltetramethyl-cyclopentadienyl-sec-butyl amido hafnium dichloride;
methylphenylsilyltetramethyl-cyclopentadienyl-sec-butyl amido hafnium dimethyl;
methylphenylsilyltetramethyl-cyclopentadienyl-tert-butyl amido titanium dichloride;
methylphenylsilyltetramethyl-cyclopentadienyl-tert-butyl amido titanium dimethyl;
methylphenylsilyltetramethyl-cyclopentadienyl-tert-butyl amido zirconium dichloride;
methylphenylsilyltetramethyl-cyclopentadienyl-tert-butyl amido zirconium dimethyl;
methylphenylsilyltetramethyl-cyclopentadienyl-tert-butyl amido hafnium dichloride;
methylphenylsilyltetramethyl-cyctopentadienyl-tert-butyl amido hafnium dimethyl;
dimethylsilytetramethylcyclopentadienyl cyclododecyl amido titanium dichloride;
dimethylsilytetramethylcyclopentadienyl cyclododecyl amido titanium dimethyl;
dimethylsilytetramethylcyclopentadienyl cyclododecyl amido zirconium dichloride;
dimethylsilytetramethylcyclopentadienyl cyclododecyl amido zirconium dimethyl;
dimethylsilytetramethylcyclopentadienyl cyclododecyl amido hafnium dichloride;
dimethylsilytetramethylcyclopentadienyl cyclododecyl amido hafnium dimethyl;
dimethylsilytetramethylcyclopentadienyl cyclohexanemethyl amido titanium dichloride;
dimethylsilytetramethylcyclopentadienyl cyclohexanemethyl amido titanium dimethyl;
dimethylsilytetramethylcyclopentadienyl cyclohexanemethyl amido zirconium dichloride;
dimethylsilytetramethylcyclopentadienyl cyclohexanemethyl amido zirconium dimethyl;
dimethylsilytetramethylcyclopentadienyl cyclohexanemethyl amido hafnium dichloride;
dimethylsilytetramethylcyclopentadienyl cyclohexanemethyl amido hafnium dimethyl;
dimethylsilytetramethylcyclopentadienyl methyl amido titanium dichloride;
dimethylsilytetramethylcyclopentadienyl methyl amido titanium dimethyl;
dimethylsilytetramethylcyclopentadienyl methyl amido zirconium dichloride;
dimethylsilytetramethylcyclopentadienyl methyl amido zirconium dimethyl;
dimethylsilytetramethylcyclopentadienyl methyl amido hafnium dichloride;
dimethylsilytetramethylcyclopentadienyl methyl amido hafnium dimethyl;
dimethylsily-tert-butylcyclopentadienyl tert-butyl amido titanium dichoride;
dimethylsily-tert-butylcyclopentadienyl tert-butyl amido titanium dimethyl;
dimethylsily-tert-butylcyclopentadienyl tert-butyl amido zirconium dichloride;
dimethylsily-tert-butylcyclopentadienyl tert-butyl amido zirconium dimethyl;
dimethylsily-tert-butylcyclopentadienyl tert-butyl amido hafnium dichoride;
dimethylsily-tert-butylcyclopentadienyl tert-butyl amido hafnium dimethyl;
dimethylsilytetramethylcyclopentadienyl phenyl amido titanium dichloride;
dimethylsilytetramethylcyclopentadienyl phenyl amido titanium dimethyl;
dimethylsilytetramethylcyclopentadienyl phenyl amido zirconium dichloride;
dimethylsilytetramethylcyclopentadienyl phenyl amido zirconium dimethyl;
dimethylsilytetramethylcyclopentadienyl phenyl amido hafnium dichloride;
dimethylsilytetramethylcyclopentadienyl phenyl amido hafnium dimethyl;
dimethylsilytetramethylcyclopentadienyl n-butyl-phenyl amido titanium dichloride;
dimethylsilytetramethylcyclopentadienyl n-butyl-phenyl amido titanium dimethyl;
dimethylsilytetramethylcyclopentadienyl n-butyl-phenyl amido zirconium dichloride;
dimethylsilytetramethylcyclopentadienyl n-butyl-phenyl amido zirconium dimethyl;
dimethylsilytetramethylcyclopentadienyl n-butyl-phenyl amido hafnium dichloride;
dimethylsilytetramethylcyclopentadienyl n-butyl-phenyl amido hafnium dimethyl;
dimethylsilytetramethylcyclopentadienyl p-methoxyphenyl amido titanium dichloride;
dimethylsilytetramethylcyclopentadienyl p-methoxyphenyl amido titanium dimethyl;
dimethylsilytetramethylcyclopentadienyl p-methoxyphenyl amido zirconium dichloride;
dimethylsilytetramethylcyclopentadienyl p-methoxyphenyl amido hafnium dichloride;
dimethylsilytetramethylcyclopentadienyl p-methoxyphenyl amido hafnium dimethyl;
dimethylsilytetramethylcyclopentadienyl cyclohexyl amido titanium dichloride;
dimethylsilytetramethylcyclopentadienyl cyclohexyl amido titanium dimethyl;
dimethylsilytetramethylcyclopentadienyl cyclohexyl amido zirconium dichloride;

dimethylsilytetramethylcyclopentadienyl cyclohexyl amido zirconium dimethyl;
dimethylsilytetramethylcyclopentadienyl cyclohexyl amido hafnium dichloride;
dimethylsilytetramethylcyclopentadienyl cyclohexyl amido hafnium dimethyl;
methylphenylsilytetramethylcyclopentadienyl phenyl amido titanium dichloride;
methylphenylsilytetramethylcyclopentadienyl phenyl amido titanium dimethyl;
methylphenylsilytetramethylcyclopentadienyl phenyl amido zirconium dichloride;
methylphenylsilytetramethylcyclopentadienyl phenyl amido zirconium dimethyl;
methylphenylsilytetramethylcyclopentadienyl phenyl amido hafnium dichloride;
methylphenylsilytetramethylcyclopentadienyl phenyl amido hafnium dimethyl;
dimethylsilytetramethylcyclopentadienyl cycloheptyl amido titanium dichloride;
dimethylsilytetramethylcyclopentadienyl cycloheptyl amido titanium dimethyl;
dimethylsilytetramethylcyclopentadienyl cycloheptyl amido zirconium dichloride;
dimethylsilytetramethylcyclopentadienyl cycloheptyl amido zirconium dimethyl;
dimethylsilytetramethylcyclopentadienyl cycloheptyl amido hafnium dichloride;
dimethylsilytetramethylcyclopentadienyl cycloheptyl amido hafnium dimethyl;
dimethylsilytetramethylcyclopentadienyl adamentyl amido titanium dichloride;
dimethylsilytetramethylcyclopentadienyl adamentyl amido titanium dimethyl;
dimethylsilytetramethylcyclopentadienyl adamentyl amido zirconium dichloride;
dimethylsilytetramethylcyclopentadienyl adamentyl amido zirconium dimethyl;
dimethylsilytetramethylcyclopentadienyl adamentyl amido hafnium dichloride;
dimethylsilytetramethylcyclopentadienyl adamentyl amido hafnium dimethyl;
diphenylgermaniumtetramethylcyclopentadienyl cyclododecyl amido titanium dichloride;
diphenylgermaniumtetramethylcycopentadienyl cyclododecyl amido titanium dimethyl;
diphenylgermaniumtetramethylcyclopentadienyl cyclododecyl amido zirconium dichloride;
diphenylgermaniumtetramethylcyclopentadienyl cyclododecyl amido zirconium dimethyl;
diphenylgermaniumtetramethylcyclopentadienyl cyclododecyl amido hafnium dichloride; and,
diphenylgermaniumtetramethylcyclopentadienyl cyclododecyl amido hafnium dimethyl.

The covalently bridged bis(indenyl) hafnocenes compounds of the invention include those hafnocenes having unsubstituted or substituted indenyl ligands wherein each hydrogen atoms of either the 5-member or 6-member rings may be replaced with an R group as defined above, that is, independently, a radical selected from $C_1$ to $C_{30}$ hydrocarbyl radicals, substituted $C_1$ to $C_{30}$ hydrocarbyl radicals wherein one or more hydrogen atoms is replaced by a halogen radical, an amido radical, a phosphido radical, an alkoxy radical, an aryloxy radical or any other radical containing a Lewis acidic or basic functionality; $C_1$ to $C_{30}$ hydrocarbyl-substituted metalloid radicals wherein the metalloid is selected from the Group IVA of the Periodic Table of Elements; halogen radicals; amido radicals; phosphido radicals; alkoxy radicals; alkylborido radicals; or any other radical containing Lewis acidic or basic functionality. Further, at least two adjacent R-groups may be joined together and along with the carbon atoms to which they are attached form a $C_4$ to $C_{20}$ ring system. Preferably the indenyl or substituted indenyl rings, when bridged to each other, will be lower alkyl-substituted ($C_1$ to $C_6$) in the 2 position and will additionally comprise alkyl, cycloalkyl, aryl, alkylaryl and or arylalkyl subtituents, the aryl- or cyclo-characterized substituents as either of fused or pendant ring structures including multi-ring structures, for example, those of U.S. Pat. Nos. 5,145,819, 5,243,001 5,278,264, 5,296,434 and 5,304,614. Such substituents should each have essentially hydrocarbyl characteristics and will typically contain up to 30 carbon atoms but may be hetero-atom containing with not more than 1-3 non-hydrogen/carbon atoms, e.g., N, S, O, P, and Si. The covalent bridging group will typically be represented by a hydride, alkyl or silyl substitute Group 14 group such as known alkanylene and silanylene bridges, preferably the covalent bridging groups based on silicon.

Examples of covalently bridged hafnocene compounds include:
dimethylsilylbis(3-methylcyclopentadienyl) hafnium dichloride
dimethylsilylbis(3-methylcyclopentadienyl) hafnium dimethyl
dimethylsilylbis(indenyl) hafnium dichloride
dimethylsilylbis(indenyl) hafnium dimethyl
dimethylsilylbis(tetrahydroindenyl) hafnium dichloride
dimethylsilylbis(tetrahydroindenyl) hafnium dimethyl
dimethylsilylbis(2-methylindenyl) hafnium dichloride
dimethylsilylbis(2-methylindenyl) hafnium dimethyl
dimethylsilylbis(2-methyl-5-isopropylindenyl) hafnium dichloride
dimethylsilylbis(2-methyl-5-isopropylindenyl) hafnium dimethyl
dimethylsilylbis(5-phenylindenyl) hafnium dichloride
dimethylsilylbis(5-phenylindenyl) hafnium dimethyl
dimethylsilylbis(2-methyl-5-phenylindenyl) hafnium dichloride
dimethylsilylbis(2-methyl-5-phenylindenyl) hafnium dimethyl
dimethylsilylbis(2-methyl-6-phenylindenyl) hafnium dichloride
dimethylsilylbis(2-methyl-6-phenylindenyl) hafnium dimethyl.

The term "noncoordinating anion" means an anion which either does not coordinate to said transition metal cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cati balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms.

Descriptions of ionic catalysts for coordination polymerization comprised of metallocene cations activated by non-coordinating anions appear in the early work in EP-A-0 277 003, EP-A-0 277 004, U.S. Pat. Nos. 5,198,401 and 5,278, 119, and WO92/00333. These teach a preferred method of preparation wherein metallocenes (bisCp and monoCp) are protonated by an anionic precursors such that an alkyl/hydride group is abstracted from a transition metal to make it both cationic and charge-balanced by the non-coordinating anion. The use of ionizing ionic compounds not containing an active proton but capable of producing the both the active metallocene cation and an noncoordinating anion is also known. See, EP-A-0 426 637, EP-A-0 573 403 and U.S. Pat. No. 5,387,568. Reactive cations other than Bronsted acids capable of ionizing the metallocene compounds include ferrocenium triphenylcarbonium and triethylsilylinium cations. Any metal or metalloid capable of forming a coordination complex which is resistant to degradation by water (or other Bronsted or Lewis Acids) may be used or contained in the anion of the second activator compound. Suitable metals include, but are not limited to, aluminum, gold, platinum and the like. Suitable metalloids include, but are not limited to, boron, phosphorus, silicon and the like. The description of non-coordinating anions and precursors thereto of these documents are incorporated by reference for purposes of U.S. patent practice.

An additional method of making the ionic catalysts uses ionizing anionic pre-cursors which are initially neutral Lewis acids but form the cation and anion upon ionizing reaction with the metallocene compounds, for example tris(pentafluorophenyl)boron acts to abstract an alkyl, hydride or silyl ligand to yield a metallocene cation and stabilizing non-coordinating anion, see EP-A-0 427 697 and EP-A-0 520 732. Ionic catalysts for addition polymerization can also be prepared by oxidation of the metal centers of transition metal compounds by anionic precursors containing metallic oxidizing groups along with the anion groups, see EP-A-0 495 375. The description of non-coordinating anions and precursors thereto of these documents are similarly incorporated by reference for purposes of U.S. patent practice.

Examples of suitable anionic precursors capable of ionic cationization of the metallocene compounds of the invention, and consequent stabilization with a resulting noncoordinating anion include trialkyl-substituted ammonium salts such as triethylammonium tetra(phenyl)boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra (o-tolyl)boron and the like; N,N-dialkyl anilinium salts such as N,N-dimethylanilinium tetra(phenyl)boron, N,N-diethylanilinium tetra(phenyl)boron, N,N-2,4,6-pentamethylanilinium tetra(phenyl)boron and the like; dialkyl ammonium salts such as di(isopropyl)ammonium tetra(pentafluorophenyl)boron, dicyclohexylammonium tetra(phenyl)boron and the like; and triaryl phosphonium salts such as triphenylphosphonium tetra)(phenyl)boron, tri (methylphenyl)phosphonium tetra(phenyl)boron, tri (dimethylphenyl)phosphonium tetra(phenyl)boron and the like.

Further examples of suitable anionic precursors include those comprising a stable carbonium ion, and a compatible non-coordinating anion. These include tropillium tetrakispentafluorophenyl borate, triphenylmethyl tetrakispentafluorophenyl borate, benzene(diazonium) tetrakispentafluorophenyl borate, tropillium phenyltrispentafluorophenyl borate, triphenylmethylium phenyltrispentafluorophenyl borate, benzene(diazonium) phenyltrispentafluorophenyl borate, tropillium tetrakis(2,3, 5,6-tetrafluorophenyl)borate, triphenylmethylium tetrakis(2, 3,5,6-tetrafluorophenyl)borate, benzene(diazonium)tetrakis (3,4,5-trifluorophenyl)borate, tropillinum tetrakis(3,4,5-trifluorophenyl)borate, benzene(diazonium)tetrakis(3,4,5-trifluorophenyl)borate, tropillium tetrakis(3,4,5-trifluorophenyl)aluminate, triphenylmethylium tetrakis(3,4, 5-trifluorophenyl)aluminate, benzene(diazonium)tetrakis (3,4,5-trifluorophenyl)aluminate, tropillinum tetrakis(1,2,2-trifluoroethenyl)borate, triphenylmethylium tetrakis(1,2,2-trifluoroethenyl)borate, benzene(diazonium)tetrakis(1,2,2-trifluoroethenyl)borate, tropillium tetrakis(2,3,4,5-tetrafluorophenyl)borate, triphenylmethylium tetrakis(2,3,4, 5-tetrafluorophenyl)borate, benzene(diazonium)tetrakis(2,3, 4,5-tetrafluorophenyl)borate, etc.

Where the metal ligands include halide moieties for example, (methylphenyl)silylene(tetra-methyl-cyclopentadienyl)(tert-butyl-amido) zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example in the process of FIG. 1, an aluminum alkyl compound may be mixed with the metallocene (15) prior to its introduction into the reaction vessel (10). Since the alkyl aluminum is also suitable as a scavenger its use in excess of that normally stoichiometrically required for akylation of the metallocene will permit its addition to the reaction solvent with the metallocene compound. Normally alumoxane would not be added with the metallocene so as to avoid premature activation, but can be added directly to the reaction vessel in the presence of the polymerizable monomers when serving as both scavanger and alkylating activator.

Known alkylalumoxanes are additionally suitable as catalyst activators, particularly for those metallocenes comprising halide ligands. The alumoxane component useful as catalyst activator typically is an oligomeric aluminum compound represented by the general formula $(R—Al—O)_n$, which is a cyclic compound, or $R(R—Al—O)_nAlR_2$, which is a linear compound. In the general alumoxane formula R is a $C_1$ to $C_5$ alkyl radical, for example, methyl, ethyl, propyl, butyl or pentyl and "n" is an integer from 1 to about 50. Most preferably, R is methyl and "n" is at least 4. Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

The term "scavenging compounds" as used in this application and in the claims is meant to include those compounds effective for removing polar impurities from the reaction solvent. Such impurities can be inadvertently introduced with any of the polymerization reaction components, particularly with solvent, monomer and catalyst feed, and adversely affect catalyst activity and stability. It can result in decreasing or even elimination of catalytic activity, particularly when a metallocene cation-noncoordinating anion pair is the catlyst system. The polar impurities, or catalyst poisons include water, oxygen, metal impurities, etc. Preferably steps are taken before provision of such into the reaction vessel, for example by chemical treatment or careful separation techniques after or during the synthesis or preparation of the various components, but some minor amounts of scavenging compound will still normally be required in the polymerization process itself Typically the scavenging compound will be an organometallic compound such as the Group-13 organometallic compounds of U.S. Pat. Nos. 5,153,157, 5,241,025, EP-A-638 and WO-A-91/09882 and WO-A-94/03506, noted above, and that of WO-A-93/14132. Exemplary compounds include triethyl aluminum, triethyl borane, tri-isobutyl aluminum, isobutyl aluminumoxane, those having bulky substituents covalently bound to the metal or metalloid center being preferred to minimize adverse interaction with the active catalyst. When an alumoxane is used as activator, additional scavenging compounds are not necessary. The amount of scavenging agent to be used with metallocene cation-noncoordinating anion pairs is minimized during polymerization reactions to that amount effective to enhance activity.

The high temperature solution process for the production of EPM and EPDM, or ethylene copolymers, in accordance with this invention will improve process economics and potentially widen product capabilities. For process economics, the combination of high reactor temperature and solvent recovery systems brings significant cost improvements. The improved economics of the high temperature solution process compared with the conventional process is related to the operation of polymerization reactor at higher polymer concentration than in conventional solution process due to improvement in the solution viscosity of the polymer at higher temperatures. A high reactor exit temperature allows the use of a solvent recovery systems resulting in improved solvent recycling economics. High efficiency recycling systems are crucial in considering the future of solution based processes in comparison with the competitive options, such as gas phase. In addition, efficient solvent recycling also reduces the environmental impact of the process with respect to volatile organic compound emissions to meet increasingly more restrictive regulatory levels. Additionally, the use of the invention process allows for high diolefin conversion from monomer to incorporated mer unit in the polymer, thus reducing cost of separation and recycle. Typical conversion ratios is of monomer converted to polymerized mer unit provided can range from 20%, 30% or up to as high as 40%, and higher.

The polymerization process of the invention involves contacting the polymerizable monomers (ethylene, α-olefin and, optionally diene monomer) in solution with the described ionic catalyst system, preferably at high reaction temperatures, from about 60° to 150° C., and preferably is conducted in the following manner. The solvent is heated to reaction temperature prior to introduction into the reaction vessel. The solvent is then provided to the reaction vessel after polymerizable monomer is introduced in either liquid, gas or solution form into that reaction solvent. A reaction medium is formed comprising the solvent within which the catalyst system and monomers are contacted for the polymerization reaction. Typically the scavenging compound is introduced into the reaction solvent to reduce or eliminate catalyst poisons introduced with any of the component elements of the reaction medium prior to introduction into the reactor, but is not contacted with the catalyst activator, if the scavenging compound and activator are different, for sufficient time to have adverse effects on the effectiveness of that activator. Then the activator and metallocene compound are contacted in the polymerization reaction vessel in the presence of the polymerizable monomers.

Typically the reaction is conducted at pressures from atmospheric to 500 psig (1–35 bar), preferably from 100 to 300 psig (8 to 21 bar). Preferred reaction temperatures are above 80° C., more preferably at or above 100° C., for instance 110° C. and above. Preferably the upper limit to the reaction temperature is 160° C., preferably 150° C. Typically the polymerization reaction will be exothermic and the reactor will be chilled or cooled in accordance with known methods to assure that temperatures do not exceed those reasonably suitable for the polymer being produced.

The feedstock purification prior to introduction into the reaction solvent follows standard practices in the art, e.g. molecular sieves, alumina beds and oxygen removal catalysts are used for the purification of ethylene, α-olefin. The solvent itself as well, e.g., hexane and toluene, are similarly treated. Purification of the dienes was observed to increase diene conversion, best results were obtained when the diene was fractionally distilled with $CaH_2$ as the purification method.

The α-olefin monomer(s) and diene monomer(s), if included, are introduced in an amount proportional to the levels of incorporation desired for the polymer to be produced and the effective reactive ratios for the polymerizable monomers in the presence of the specific catalyst chosen. In the preferred embodiment the combination of the α-olefin monomer(s) in reaction solvent is introduced into the reactor and effective vapor pressure of the α-olefin monomer(s) is maintained according to the rate of incorporation into the copolymer product. In an alternative embodiment, the partial pressure in the reactor will be provided by ethylene alone in which situation the α-olefin monomer(s) are added solely with reaction solvent. The amounts and vapor pressure will vary according to catalyst selection and polymer to be produced, but can be empirically determined well within the skill in the art, particularly in view of the description provided in the following examples.

Figure 2:
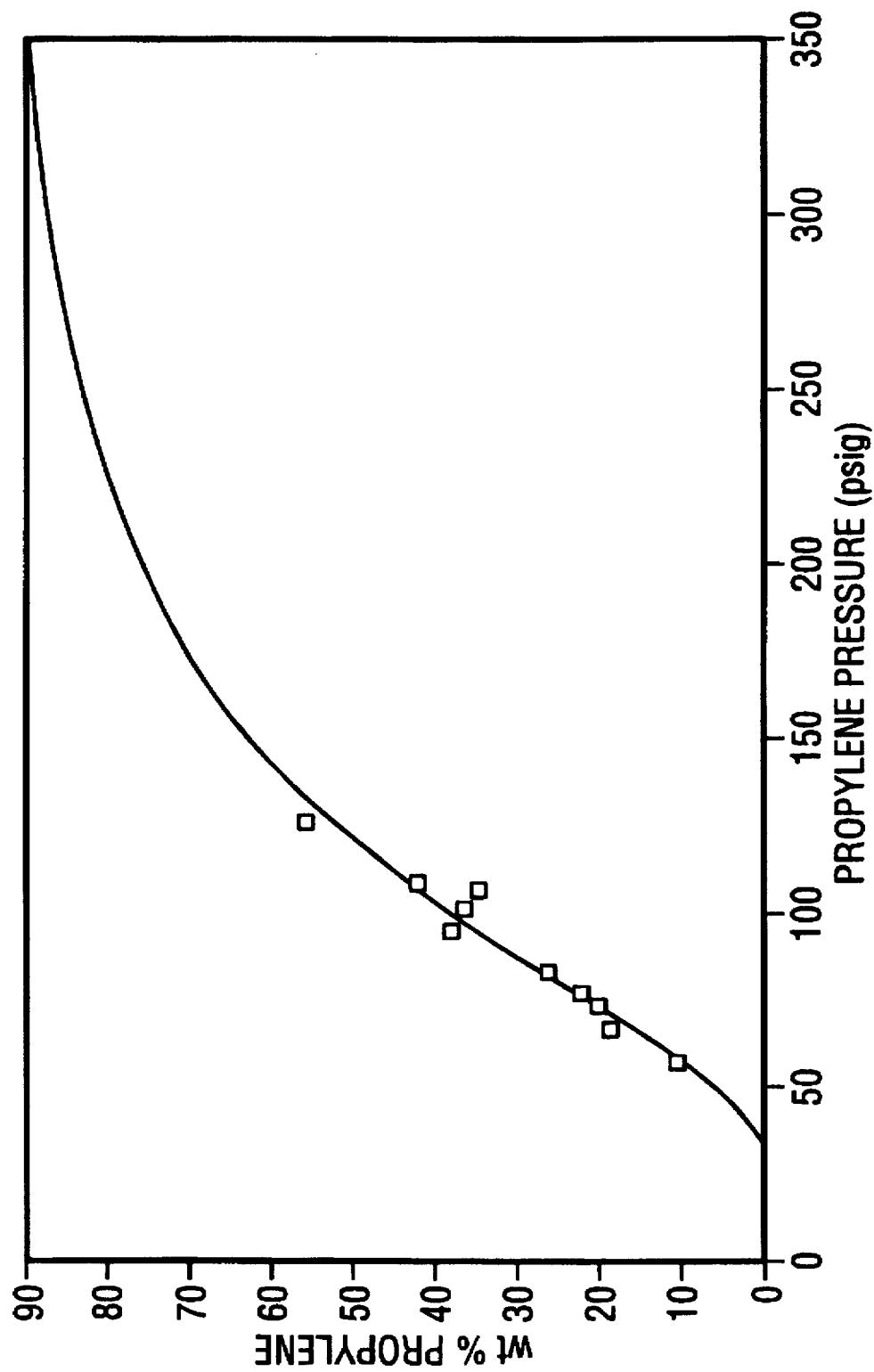
FIG. 2 is a plot of wt. % propylene against propylene pressure (psig) from which a slope was determined to control the propylene partial pressure of the reaction vessel to obtain copolymer of selected comonomer composition.

Typically the following guidelines can be used to determine operating conditions. Incorporation in the polymer can be controlled by adjusting the saturation pressure of propylene in the propylene absorber. This partial pressure is proportional to the concentration of propylene to be established in the reaction solvent. Based on copolymerization models known in the art (Cozewith and Verstrate, supra), this concentration is determined by the catalyst reactivity ratios as determined in a series of runs. An example of the correlation of propylene partial pressure and polymer composition is shown in FIG. 2. The data points were obtained from Table 7, Example 7. The line was calculated from the polymerization model using the monomer concentrations and catalyst reactivity ratios. Best values for the reactivity ratios were obtained from the minimization of the differences between the data and the calculations.

The catalyst activator, that is the non-coordinating anion precursor, or ionizing anionic precursor, or alumoxane, can be introduced along with or separately from introduction of the optional diolefin monomer(s), if used. The diolefin can be provided in an amount effective for its rate of reaction and rate of conversion. The catalyst activator can be provided in an amount that is equal to 0.2 to 10 molar equivalents of the Group 4 metallocene compound, preferably 0.25 to 5, and even more preferably 0.33 to 3.0, when a noncoordinating anion precursor. Typically provision of the noncoordinating anion precursor activator will be in an effective solvent, typically an aromatic solvent such as toluene. When the activator is alumoxane, it can be used in an amount that is equal to 0.5 to 10,000 molar equivalents of the cyclopentadienyl metallocene compound, preferably 0.75 to 5000, and even more preferably 1.0 to 500. Preferably the alumoxane will be used in an amount empirically determined to suffice for concurrent removal of impurities and activation, but only is such amounts as necessary to accomplish those functions. Monitoring of polymerization activity by known methods will permit on-line adjustment of alumoxane to assure neither excess nor deficit amounts are mantained for unwanted periods.

The organoaluminum compound that serves as scavenger for adventitious impurities is provided separately afterwards or with one of the foregoing feedstreams, in an amount suitable to increase the activity of the catalyst but in an amount lower than that at which depression of reactivity is observed. Typically an effective amount of the organoaluminum compound is about 0 (e.g., with an alumoxane activator) to 100 mol. ratio based upon the ratio of scavenging compound to activator, preferably the ratio is 0.3 to 30, and most preferably it is 0.5 to 10.

Promptly thereafter, most preferably within not more than about 1 minute, more preferably within 30 seconds, the metallocene compound is contacted with the activator in the presence of the polymerizable monomers so as to limit the residence time of the scavenging compound with the activator. The metallocene is typically provided in an aliphatic or aromatic slovent, which can be any of those suitable as polymerization medium. For ease of reference the examples below refer to the metallocene in solvent as "catalyst solution". Though any order of activation will have at least some suitability, the order of addition described herein is particularly suitable for use with ionizing activators that provide the stabilized metallocene cation-noncoordinating anion pair. Since alumoxane can act as a suitable scavenger compound, its addition as activator in accordance with the described process eliminates the need to introduce a scavenger and the requirement for limited time of contact between scavenger and activator is rendered unnecessary so long as the addition of the metallocene to activator containing solution is in the presence of polymerizable monomers. In this manner premature activation can be avoided.

Ethylene gas is then provided into the reaction vessel in an amount proportional to the level of incorporation desired and the effective reactive ratios for the polymerizable monomers in the presence of the specific catalyst chosen, as with the α-olefin monomer(s). The polymerization commences upon contact of the monomers with the activated catalyst and the rates of provision of each of the components of the system are adjusted for stable operations at the level of production, molecular weight, monomer incorporation and equipment limitations. The reaction temperature may be permitted to exceed the initial temperature but will preferably be at all times greater than the lower limit of the ranges described above for the invention process.

The solvents for the polymerization reaction will comprise those known for solution polymerization, typically the alipahtic solvents represented by hexane, or the aromatic solvents, represented by toluene. Additional examples include heptane, cyclohexane, and Isopar® E ($C_8$ to $C_{12}$ aliphatic solvent, Exxon Chemical Co., U.S.). Preferably the solvent is aliphatic, most preferably it is hexane.

Though the Examples and the discussion are directed to a single reactor configuration and narrow polydispersity polymers, it is well-known that the use in series of two such reactors each operated so as to achieve different polymer molecular weight characteristics, or by blending polymers from different reactor conditions, can yield improved processing polymers. The disclosures of U.S. Pat. No. 4,722,971 and WO 93/21270 are instructive and are incorporated for purposes of U.S. patent practice. Though directed to the use of vanadium catalysts, the substitution of the metallocene catalyst systems of this invention into one such reactor, or two different invention catalysts into two such reactors, or similar use in two separate polymerizations with subsequent physical blending of the polymer products, will permit tailoring of characteristics (e.g., molecular weights and diene contents) suitable for balancing vulcanization properties with processability. Similarly, the use of mixed catalyst systems, the invention catalysts with themselves or with others, in one or more such reactors will permit preparation of bimodal or multimodal EPR polymers having improved processing properties.

The following examples are presented to illustrate the foregoing discussion. All parts, proportions and percentages are by weight unless otherwise indicated. Although the examples may be directed to certain embodiments of the present invention, they are not to be viewed as limiting the invention in any specific respect. Methods of determining $M_n$ and monomer contents by NMR and GPC for the EPDM and EODM polymer products of the invention are described in U.S. Pat. No. 5,229,478 which is incorporated by reference for purposes of U.S. patent practice. For measurement of comonomer contents in EPM (EOM, etc.) the method of ASTM D3900 for ethylene-propylene copolymers between 35 and 85 wt. % ethylene was used. Outside that range the NMR method was used. See also, U.S. Pat. No. 4,786,697 which is incorporated by reference for purposes of U.S. Patent practice.

EXAMPLE 1

Synthesis of EPM

At room temperature, an autoclave reactor was charged with 200 cc of hexane and 50 cc of a $2.0M \times 10^{-3}M$ toluene solution of the activator. The reactor pressure was vented before heating to the reaction temperature of 115° C. Propylene was added until reactor reached the designated pressure varying from 80.3 to 127.2 psig (5.5 to 8.8 bar), as shown in Table 1. The reactor pressure was raised to 235 psig (16.2 bar) with ethylene. Under these conditions, the monomer concentrations varied from 06.4 to 1.33M for propylene and it was 0.87M for ethylene, resulting in monomer concentration molar ratios ($C_3/C_2$) varying from 0.735 to 1.53M. To the pressurized reactor, 10 microliters of a 1.3M of a pentane triisooctyl aluminum solution was added as scavenger. After adjusting reactor pressure, the polymerization was run under semibatch mode with pure ethylene feed to the reactor. The metallocene compound pumping was started within 30 secs from the addition of the scavenger. The metallocene catalyst concentration was $0.2 \times 10^{-3}M$ in toluene and the pumping rate was between 0.25 and 2 cc/min depending of the ethylene make-up flow rate. This flow rate was kept at about 0.1 SLPM (Standard Liter per minute). The polymerization was run for 30 min. Table 1 shows the propylene partial pressure at the beginning of the run, the polymer yield, the total catalyst usage, the catalyst efficiency, the polymer analysis for wt. % of ethylene, the number average molecular weight ($M_n$) the polydispersity, $P_f = M_w/M_n$.

TABLE 1

Results for Example 1
Catalyst: dimethylsilyl(bis)indenyl dimethyl hafnium
Activator: dimethylanilinium(tetra)perfluorinated-phenyl borate
Temperature: 115° C.
Pressure: 235 psig (16.2 bar)

| Propylene Press. psig (bar) | Polymer Yield (g) | Catalyst Usage (mg) | Catalyst Effic. (kg/g) | $C_2$ (wt. %) | Mn | PD |
|---|---|---|---|---|---|---|
| 91.1 (6.3) | 5.1 | 3.5 | 1.46 | 69.5 | 94462 | 1.54 |
| 90.4 (6.2) | 2.88 | 0.7 | 4.11 | 70.1 | 96489 | 1.67 |
| 80.3 (5.5) | 8.855 | 0.1 | 88.55 | 78.1 | 90586 | 1.98 |
| 95.1 (6.6) | 6.97 | 0.66 | 10.56 | 72 | 93169 | 1.71 |
| 85.0 (5.9) | 6.58 | 0.18 | 36.56 | 74.8 | 107281 | 1.65 |
| 127.2 (8.8) | 3.4 | 0.9 | 3.78 | 50.9 | 42224 | 2.05 |
| 127.2 (8.8) | 6.8 | 0.54 | 12.59 | 38.4 | 29118 | 1.72 |

Comparative Example 1

Synthesis of EPM With Bridged Zirconocene

The autoclave reactor was charged with 250 cc of hexane and heated up to 80° C. The solvent was saturated with an ethylene/propylene mixture with a composition as $C_3/C_2$ (v/v) ratios equal to 7.4 resulting in a reactor pressure of 110 psig (7.6 bar). The catalyst was dimethylsily(bis) tetrahydroindenyl zirconium dimethyl and the activator was diethylanilinum n-butyl(tris)pentafluorophenyl boron. The catalyst and activator were mixed together before the addition to the reactor (preactivated mode). The resulting solution concentration was $2.0 \times 10^{-3}M$ for the catalyst and $2.0 \times 10^{-3}M$ for the activator. The polymerization was run for 18 minutes with the catalyst pumping between 1 and 3 cc/min. The result was 13.8 g of liquid EP polymer with $M_n$ 1274, polydispersity of 4.25 and containing 54.6 wt. % of ethylene.

EXAMPLE 2

Synthesis of EPM

Following a procedure similar to Example 1, the polymerization was carried out with the reactor charged with 250 cc of toluene and 5 cc of a 10 wt. % toluene solution of the activator (methylaluminoxane, MAO). In this example, propylene was added by volume, as shown in Table 2. The reactor pressure was raised to 235 psig (16.2 bar) with ethylene, except where noted in Table 2. Under these conditions, the monomer concentrations varied from 1.5 to 2.2M for propylene and 0.39 to 0.87M for ethylene, resulting in a monomer concentration molar ratios ($C_3/C_2$) varying from 1.72 to 5.66M. MAO was used as an activator to give an Al/Ti ratio of about 100. No scavenger compound was added in this example. After adjusting the reactor pressure, the polymerization was run under the semibatch mode with pure ethylene feed or mixed feed to the reactor, as noted in Table 2. The catalyst solution concentration was $0.21 \times 10^{-3}M$ and the pumping rate was adjusted depending on the ethylene make-up flow rate. The polymerization time was 30 min. Table 2 shows the propylene volume, the polymer yield, the catalyst efficiency, the ethylene content, the number average molecular weight and the polydispersity.

TABLE 2

Results for Example 2
Catalyst: dimethylsilyl tetramethylcyclopentadienyl cyclododecyl amido dichloride titanium
Activator: methyalumoxane
Temperature: 115° C.
Pressure: 235 psig (16.2 bar)

| Propylene Volume (cc) | Polymer Yield (g) | Catalyst Usage (mg) | Catalyst Effic. (kg/g) | $C_2$ (wt. %) | Mn | PD |
|---|---|---|---|---|---|---|
| 44 | 8 | 0.3 | 26.67 | 37.0 | 57092 (a) | 2.2 |
| 30 | 14.4 | 0.2 | 72.00 | 37.4 | 118508 | 2.0 |
| 30 (b & c) | 12.3 | 0.7 | 17.57 | 58.8 | 55524 | 2.1 |
| 30 (b) | 8.5 | 0.5 | 17.00 | 61.8 | 71529 | 2.0 |

(a) Reactor Pressure = 125 psig (16.2 bar).
(b) Mixed feed $C_2/C_3$ vapor (molar) = 1.0
(c) Hexane instead of toluene as the solvent.

EXAMPLE 3

Synthesis of EBM, 1-Butene as Comonomer

Following the same procedure as in Example 2, the polymerization was carried out with the reactor charged with 250 cc of toluene and 5 cc of a 10 wt. % toluene solution of MAO. The 1-butene was added by volume, as shown in Table 3. The reactor pressure was completed to 125 psig (8.6 bar) with ethylene. Under these conditions, the monomer concentrations varied from 0.44 to 2.43M for 1-butene and it was 0.39M for ethylene, resulting in monomer concentration molar ratios ($C_4/C_2$) varying from 0.44 to 2.43M. The polymerization was run under the semibatch mode with pure ethylene feed to the reactor. The catalyst solution concentration was $0.21 \times 10^{-3}M$. The polymerization time was 15 min. Table 3 shows the 1-butene volume, the polymer yield, the catalyst usage, the catalyst efficiency, the ethylene content, the number average molecular weight and the polydispersity.

TABLE 3

Results for Example 3
Catalyst: Same as Example 2
Activator: Same as Example 2
Temperature: 115° C.
Pressure: 125 psig (8.6 bar)

| 1-Butene Volume (cc) | Polymer Yield (g) | Catalyst Usage (mg) | Catalyst Effic. (kg/g) | $C_2$ (wt. %) | Mn | PD |
|---|---|---|---|---|---|---|
| 15.1 | 9.8 | 0.4 | 24.50 | 68.1 | 63891 | 1.95 |
| 7.6 | 7.6 | 0.4 | 19.00 | 83.8 | 78677 | 1.98 |
| 11.4 | 5.5 | 0.4 | 13.75 | 68.8 | 58715 | 1.70 |
| 7 | 6.13 | 0.3 | 20.43 | 71.9 | 79327 | 1.82 |
| 4 | 5 | 0.3 | 16.67 | 84.6 | 97805 | 1.89 |
| 6 | 4.59 | 0.4 | 11.48 | 74.8 | 84283 | 1.78 |
| 7 | 5.36 | 0.4 | 13.40 | 68.4 | 79786 | 1.96 |
| 4 | 4.89 | 0.4 | 12.23 | 78.1 | 102510 | 1.81 |
| 5 | 4.96 | 0.4 | 12.40 | 74.7 | 95248 | 1.81 |

EXAMPLE 4

Synthesis of EHM, 1-Hexene as Comonomer

Following the same procedure as in Example 3, the polymerization was carried out with the reactor charged with 250 cc of toluene and 5 cc of a 10 wt. % toluene solution of MAO. The 1-hexene was added by volume, as shown in Table 4. The reactor pressure was 125 psig (8.6 bar) with ethylene. Under these conditions, the monomer concentrations varied from 0.32 to 0.65M for 1-hexene and it was 0.39M for ethylene, resulting in monomer concentration molar ratios of 0.83 to 1.66M. The polymerization was run under the semibatch mode with pure ethylene feed to the reactor. The catalyst solution concentration was $0.21 \times 10^{-3}$M. The polymerization time was 15 min. Table 4 shows the 1-hexene volumes, the polymer yield, the catalyst usage, the catalyst efficiency, the ethylene content, the number average molecular weight and the polydispersity.

TABLE 4

Results for Example 4
Catalyst: Same as Example 2
Activator: Same as Example 2
Temperature: 115° C.
Pressure: 125 psig (8.6 bar)

| 1-Hexene Volume (cc) | Polymer Yield (g) | Catalyst Usage (mg) | Catalyst Effic. (kg/g) | $C_2$ (wt. %) | Mn | PD |
|---|---|---|---|---|---|---|
| 10 | 6.53 | 0.2 | 32.65 | 88.7 | 100135 | 1.98 |
| 20 | 8.78 | 0.5 | 17.56 | 54.2 | 67108 | 1.89 |
| 15 | 7.97 | 0.3 | 26.57 | 62.0 | 79628 | 2.04 |
| 10 | 6.91 | 0.3 | 23.03 | 76.9 | 73994 | 1.79 |
| 14 | 8.66 | 0.3 | 28.87 | 67.6 | 75298 | 2.08 |
| 13 | 9.15 | 0.3 | 30.50 | 70.6 | 80794 | 1.94 |

EXAMPLE 5

Synthesis of EOM, 1-Octene as Comonomer

Following the same procedure as in Example 4, the polymerization was carried out with the reactor charged with 250 cc of toluene and 5 cc of a 10 wt. % toluene solution of MAO. The 1-octene was added by volume, as shown in Table 5. The reactor pressure was 125 psig (8.6 bar) with ethylene. Under these conditions, the monomer concentrations varied from 0.26 to 2.55M for 1-octene and from 0.39 to 5.22M for ethylene, resulting in monomer concentration molar ratios ($C_8/C_2$) of 0.49 to 6.56M. The polymerization was run under the semibatch mode with pure ethylene feed to the reactor. The catalyst solution concentration was $0.21 \times 10^{-3}$M. The polymerization time was 15 min. Table 5 shows the 1-octene volume, the polymer yield, the catalyst usage, the catalyst efficiency, the ethylene content, the number average molecular weight and the polydispersity.

TABLE 5

Results for Example 5
Catalyst: Same as Example 2
Activator: Same as Example 2
Temperature: 115° C.
Pressure: 125 psig (8.6 bar)

| 1-Octene Volume (cc) | Polymer Yield (g) | Catalyst Usage (mg) | Catalyst Effic. (kg/g) | $C_2$ (wt. %) | Mn | PD |
|---|---|---|---|---|---|---|
| 20 | 13.87 | 1.83 | 7.58 | 78.41 | 83016 | 1.81 |
| 10 (a) | 7.49 | 2.41 | 3.11 | 79.20 | 179309 | 2.17 |
| 20 | 15.54 | 0.58 | 26.79 | 70.40 | 58525 | 2.04 |
| 25 | 12.53 | 0.57 | 21.98 | 67.37 | 60909 | 2.02 |
| 30 | 12.04 | 0.4 | 30.10 | 68.29 | 56772 | 2.0 |
| 40 | 13.2 | 0.4 | 33.00 | 59.58 | 56795 | 1.91 |

(a) Temperature = 90° C.,
Pressure = 105 psig (7.2 bar).

EXAMPLE 6

Synthesis of EDM, 1-Decene as Comonomer

Following the same procedure as in Example 5, the polymerization was carried out with the reactor charged with 250 cc of toluene and 5 cc of a 10 wt. % toluene solution of MAO. The 1-decene was added by volume, as shown in Table 6. The reactor pressure was 125 psig (8.6 bar) with ethylene. Under these conditions, the monomer concentrations varied from 0.42 to 0.64M for 1-hexene and it was 0.39M for ethylene, resulting in monomer concentration molar ratios ($C_{10}/C_2$) of 1.1 to 1.64M The polymerization was run under the semibatch mode with pure ethylene feed to the reactor. The catalyst solution concentration was $0.21 \times 10^{-3}$M. The polymerization time was 15 min. Table 6 shows the 1-hexene volume, the polymer yield, the catalyst usage, the catalyst efficiency, the ethylene content, the number average molecular weight and the polydispersity.

TABLE 6

Results for Example 6
Catalyst: Same as Example 2
Activator: Same as Example 2
Temperature: 115° C.
Pressure: 125 psig (8.6 bar)

| 1-Decene Volume (cc) | Polymer Yield (g) | Catalyst Usage (mg) | Catalyst Effic. (kg/g) | $C_2$ (wt. %) | Mn | PD |
|---|---|---|---|---|---|---|
| 30 | 10.36 | 0.4 | 25.90 | 49.05 | 56269 | 2.06 |
| 20 | 5.35 | 0.5 | 10.70 | 57.67 | 67145 | 2.22 |
| 25 | 10.16 | 0.4 | 25.40 | 49.78 | 72199 | 1.88 |
| 23 | 6.37 | 0.4 | 15.93 | 51.71 | 78511 | 1.97 |
| 27 | 13.39 | 0.4 | 33.48 | 49.94 | — | — |

EXAMPLE 7

Synthesis of EPM

At room temperature, the autoclave reactor was charged with 200 cc of hexane and 50 cc of a $0.5 \times 10^{-3}$M toluene solution of the activator. The reactor pressure was vented before heating to the reaction temperature of 115° C. Propylene was added until reactor reached the designated pressure varying from 58.5 to 125.7 psig (4.0 to 8.6 bar), as shown in Table 7. The reactor pressure was raised to 235 psig (16.2 bar) with ethylene. Under these conditions, the monomer concentrations varied from 0.32 to 1.31M for propylene and it was 0.87M for ethylene, resulting in monomer concentration molar ratios ($C_3/C_2$) varying from 0.37 to 1.51M. To the pressurized reactor, 10 microliters of a 1.3M of a pentane triisobutyl aluminum solution is added as scavenger. After adjusting reactor pressure, the polymerization was run under semibatch mode with pure ethylene feed. The catalyst pumping was started within 30 sec from the addition of the scavenger. The catalyst solution concentration was $0.6 \times 10^{-3}$M in toluene and the pumping rate was adjusted depending of the ethylene make-up flow rate. This flow rate was kept at about 0.1 SLPM. The polymerization was run for 60 min. Table 7 shows the propylene partial pressure at the beginning of the run, the polymer yield, the total catalyst usage, the catalyst efficiency, the polymer analysis for wt. % of ethylene, the number average molecular weight and the polydispersity.

TABLE 7

Results for Example 7
Catalyst: dimethylsilyl tetramethylcyclopentadienyl cyclododecyl amido dimethyl titanium
Activator: dimethylanilinium (tetra)perfluorinated-phenyl borate
Temperature: 115° C.
Pressure: 235 psig (16.2 bar)

| Propylene Pres. psig (bar) | Polymer Yield (g) | Catalyst Usage (mg) | Catalyst Effic. (kg/g) | C₂ (wt. %) | Mn | PD |
|---|---|---|---|---|---|---|
| 107.9 (7.4) | 14.49 | 2.4 | 6.04 | 51.5 | 103883 | 1.92 |
| 58.5 (4.0) | 11.64 | 4.8 | 2.43 | 84.7 | 128157 | 2.59 |
| 78.7 (5.4) | 4.51 | 6 | 0.75 | 69.8 | 215334 | 1.90 |
| 74.8 (5.2) | 6.1 | 1 | 6.10 | 72.2 | 156567 | 2.58 |
| 103.3 (7.1) | 7.1 | 0.4 | 17.75 | 53.1 | 138537 | 1.94 |
| 110.5 (7.6) | 6.39 | 0.6 | 10.65 | 47.3 | 78396 | 2.79 |
| 67.4 (4.6) | 2.82 | 0.4 | 7.05 | 73.6 | 234458 | 1.95 |
| 125.7 (8.7) | 7.51 | 0.6 | 12.52 | 39.2 | 100830 | 1.92 |
| 97.4 (6.7) | 6.55 | 1.4 | 4.68 | 56.1 | 129724 | 2.14 |
| 88.1 (6.1) | 3.46 | 1 | 3.46 | 55 | 91141 | 2.02 |
| 118 (8.1) | 10.04 | 4.6 | 2.18 | 41.7 | 93786 | 1.78 |
| 88.2 (6.1) | 8.75 | 2.2 | 3.98 | 59.5 | 133199 | 2.05 |

Comparative Example 7

Synthesis of EPM, Preactivation of the Catalyst

The procedure in Example 7 was carried out by preactivating the catalyst with the activator instead of in-situ activation, as done in Example 7. The preactivation was done in the dry box by mixing the catalyst and the activator in toluene for at least 10 minutes. The concentration of the preactivated catalyst solution was $1.4 \times 10^{-3}$M. The autoclave reactor was charged with 250 cc of hexane. The reactor pressure was vented before heating to the reaction temperature of 115° C. Propylene was added until reactor reached the designated pressure varying from 84.9 to 109.1 psig (5.9 to 7.5 bar), as shown in Table 7C. The reactor pressure was raised to 235 psig (16.2 bar) with ethylene. Under these conditions, the monomer concentrations varied from 0.71 to 1.06M for propylene and it was 0.87 M for ethylene, resulting in monomer concentration molar ratios ($C_3/C_2$) varying from 0.82 to 1.22M. To the pressurized reactor, 10 microliters of a 1.3M of a triisobutyl aluminum solution was added as scavenger. After adjusting reactor pressure, the polymerization was run under semibatch mode with pure ethylene feed. The polymerization was run for 60 min. Table 7C shows the propylene partial pressure at the beginning of the run, the polymer yield, the total catalyst usage, the catalyst efficiency, the polymer analysis for wt. % of ethylene, the number average molecular weight and the polydispersity. The in situ activation (Example 7) resulted in higher catalyst efficiency and narrower molecular weight distribution than the preactivated case.

TABLE 7C

Results for Comparative Example 7
Catalyst: dimethylsilyl tetramethylcyclopentadienyl cyclododecyl amido dimethyl titanium
Activator: dimethylanilinium (tetra)perfluorinated-phenyl borate
Temperature: 115° C.
Pressure: 235 psig (16.2 bar)

| Propylene Pres. psig (bar) | Polymer Yield (g) | Catalyst Usage (mg) | Catalyst Effic. (kg/g) | C₂ (wt. %) | Mn | PD |
|---|---|---|---|---|---|---|
| 109.1 (7.5) | 18.25 | 13.5 | 1.35 | 34.30 | 41409 | 2.077 |
| 97.2 (6.7) | 9.02 | 28.8 | 0.31 | 51.50 | 99934 | 1.767 |
| 108.5 (7.5) | 19.35 | 10.8 | 1.79 | 54.90 | 82555 | 2.317 |
| (a) | 13.12 | 4.8 | 2.73 | 76.90 | 74544 | 3.634 |
| 84.9 (5.9) | 3.42 | 7.2 | 0.48 | 64.70 | 41177 | 4.013 |

(a) Propylene volume = 15 cc

EXAMPLE 8

Synthesis of EODM, With VNB as the Diene

The autoclave reactor was charged with 250 cc of hexane, and the designated volumes of 1-octene and vinylnorbornene (VNB). The mixture was heated to 115° C. and pressurized with ethylene to 210 psig (14.5 bar). Under these conditions, the monomer concentrations varied from 0.255M for 1-octene, 0.761M for ethylene and 0.11M for VNB. The polymerization time was 15 min. The catalyst was preactivated in the dry box following the same procedure as Comparative Example 7. The activated catalyst concentration was $0.8 \times 10^{-3}$M and the pumping rate was adjusted to keep a constant ethylene make-up flow to the reactor. The scavenger solution was the same as in Example 1, an the amount used varied form 5 to 12 microliters. Table 8 shows the 1-octene and VNB volumes, the polymer yield, the total catalyst usage, the catalyst efficiency, the polymer analysis for wt. % of ethylene, and wt. % of diene, the number average molecular weight and the polydispersity.

TABLE 8

Results for Example 8
Catalyst: dimethylsilyl tetramethylcyclopentadienyl cyclododecyl amido dimethyl titanium
Activator: (tris)perfluorinated-phenyl borate
Temperature: 115° C.
Pressure: 210 psig (14.5 bar)

| 1-Octene Vol. (cc) | VNB Vol. (cc) | Polymer Yield (g) | Catalyst Usage (mg) | Catalyst Effic. (kg/g) | $C_2$ (wt. %) | VNB (wt. %) | $M_n$ | PD |
|---|---|---|---|---|---|---|---|---|
| 10 | 4 | 3.5 | 6.56 | 0.53 | 72.60 | 5.50 | 92500 | 3.74 |
| 10 | 4 | 2.1 | 10.9 | 0.19 | 68.70 | 2.10 | 80600 | 2.98 |

EXAMPLE 9

Synthesis of EODM, With ENB as the Diene

Following the same procedure as in Example 8, using ethylidenevinylnorbornene (ENB) as the diene, the autoclave reactor was charged with 250 cc of hexane, and the designated volumes of 1-octene and ethylidenevinylnorbornene (ENB). The mixture was heated to 115° C. and pressurized with ethylene to 210 psig (14.5 bar). The polymerization time was 15 min. The catalyst and activator was the same as in Example 8. The catalyst was preactivated in the dry box following the same procedure as Comparative Example 7. The activated catalyst concentration was 5.6× $10^{-3}$M and the pumping rate was adjusted to keep a constant ethylene make-up flow to the reactor. The scavenger solution was the same as in Example 1, and the amount used was 10 microliters. For a 1-octene volume of 10 cc and an ENB volume of 10 cc. Under these conditions, the monomer concentrations of 0.255M for 1-octene, 0.397M for ENB and 0.761M for ethylene. The polymer yield was 14 g, at a total catalyst usage of 7.2 mg, giving a catalyst efficiency of 1.94 Kg/g, and the polymer product contained 71.9 wt. % of ethylene, and 1.1 wt. % of diene, a number average molecular weight of 79300 and a polydispersity of 3.43.

EXAMPLE 10

Synthesis of EPDM, ENB as the Diene

At room temperature, the autoclave reactor was charged with 200 cc of hexane, 50 cc of a 0.5×$10^{-3}$M toluene solution of the activator and the designated volume of ENB, as shown in Table 9. The reactor pressure was vented before heating to the reaction temperature of 115° C. Propylene was added until reactor reached the designated pressure of 103 psig (7.1 bar). The reactor pressure was raised to 235 psig (16.2 bar) with ethylene. Under these conditions, the monomer concentrations were 0.97M for propylene, 0.97M for propylene, 0.87M for ethylene, and ENB concentrations varying from 0.015M to 0.15M. To the pressurized reactor, 10 microliters of the same scavenger solution as in Example 1 was added. After adjusting reactor pressure, the polymerization was run under semibatch mode with pure ethylene feed to the reactor. The catalyst pumping was started within 30 sec from the addition of the scavenger. The catalyst solution concentration was 0.46×$10^{-3}$M in toluene and the pumping rate was between 0 and 0.5 cc/min depending of the ethylene make-up flow rate. This flow rate was kept at about 0.1 SLPM. The polymerization was run for 30 min. At the end of the polymerization, the polymer solution was mixed with a 0.3 wt. % hexane solution of IRGANOX® 1076 for about 5 minutes, before the polymer precipitation with isopropyl alcohol. The precipitated polymer was blown down and dried in the vacuum oven at 90° C. for about 1 hour. Table 9 shows the ENB volume, the polymer yield, the total catalyst usage, the catalyst efficiency, the polymer analysis for wt. % of ethylene and wt. % of ENB, the number average molecular weight and the polydispersity.

TABLE 9

Results for Example 10
Catalyst: dimethylsilyl tetramethylcyclopentadienyl cyclododecyl amido dimethyl titanium
Activator: dimethylanilinium (tetra)perfluorinated-phenyl borate
Temperature: 115° C.
Pressure: 235 psig (16.2 bar)

| ENB Vol. (cc) | Polymer Yield (g) | Catalyst Usage (mg) | Catalyst Effic. (kg/g) | $C_2$ (wt. %) | ENB (wt. %) | $M_n$ | PD |
|---|---|---|---|---|---|---|---|
| 0.5 | 12.73 | 0.8 | 15.91 | 57.56 | 1.75 | 96800 | 2.34 |
| 5 | 8.7 | 2.2 | 3.95 | 50.31 | 10.58 | 89600 | 2.55 |
| 3 | 10.7 | 3.4 | 3.15 | 51.01 | 10.79 | 77200 | 3.34 |
| 1.5 | 12.4 | 0.8 | 15.50 | 57.81 | 4.68 | 94300 | 2.7 |

The following is claimed:

1. In a process for the preparation of an ethylene-α-olefin/diolefin copolymer having an Mn greater than about 60,000 said process comprising contacting ethylene, one or more α-olefin monomers, and optionally one or more diene monomers in solution with an activated Group 4 metallocene compound, the improvement comprising:

(a) conducting the polymerization reaction at a temperature of 100° to 150° C.;

(b) selecting as the Group 4 metallocene compound one or more members of the group consisting of cyclic monocyclopcndaclicnyl Group 4 metal and covalently bridged (bis)indenyl hafnium metallocene compounds; and (c) recovering said copolymer.

2. In a process for the preparation of an ethylene-α-olefin/diolefin copolymer having an $M_n$ greater than about 60,000 said process comprising contacting ethylene, one or more α-olefin monomers, and optionally one or more diene monomers in solution with an activated group 4 metallocene compound, the improvement comprising:

(a) conducting the polymerization reaction at a temperature of about 80° to 150° C.;

(b) selecting as the Group 4 metallocene compound one or more members of the group consisting of cyclic monocyclopendadienyl Group 4 metal and covalently bridged (bis)indenyl hafnium metallocene compounds, said activated Group 4 metallocene compound is stabilized with a noncoordinating anion; and (c) recovering said copolymer.

3. The process of claim 1 wherein said activated Group 4 metallocene compound is based on dimethylsilyl(bis) indenyl dimethyl hafnium.

4. The process of claim 1 wherein said Group 4 metallocene compound is based on dimethylsilyl tetramethylcyclopentadienyl cyclododecyl amido dimethyl titanium.

5. The process of claim 2 wherein said Group 4 metallocene compound is based on dimethylsilyl(bis)indenyl dimethyl hafnium.

6. The process of claim 2 wherein said Group 4 metallocene compound is based on dimethylsilyl tetramethylcyclopentadienyl cyclododecyl amido dimethyl titanium.

7. In a process for the preparation of an ethylene-α-olefin/ diolefin copolymer having an $M_n$ greater than about 60,000 said process comprising contacting ethylene, one or more α-olefin monomers, and optionally one or more diene monomers in solution with an activated Group 4 metallocene compound, the compound the improvement comprising:

(a) conducting the polymerization reaction at a temperature of about 80° to 150° C.;

(b) selecting as the Group 4 metallocene compound one or more members of the group consisting of cyclic mono-cyclopendadienyl Group 4 metal and covalently bridge (bis)indenyl hafnium metallocene compounds; and (c) recovering said copolymer wherein said copolymer is a rubber and said one or more α-olefins comprise propylene or octene.

8. In a process for the preparation of an ethylene-α-olefin/ diolefin copolymer having an $M_n$ greater than about 60,000 said process comprising contacting ethylene, one or more α-olefin monomers, and a diene monomer in solution with an activated Group 4 metallocene compound, the improvement comprising:

(a) conducting the polymerization reaction at a temperature of about 80° to 150° C.;

(b) selecting as the Group 4 metallocene compound one or more members of the group consisting of cyclic mono-cyclopendadienyl Group 4 metal and covalently bridged (bis)indenyl hafnium metallocene compounds; and (c) recovering said copolymer wherein said copolymer is a rubber and said one or more α-olefin monomers comprises propylene or octene.

9. The process of claim 8 wherein said diene monomer is an alkenyl or alkylidene norborene.

10. The process of claim 8 wherein said diene monomer is 1,4-hexadiene.

11. The process of claim 8 wherein said diene monomer is 5-vinyl-2-norborene or 5-ethylidene-2-norborene.

\* \* \* \* \*